United States Patent [19]
Palmer et al.

[11] Patent Number: 5,800,582
[45] Date of Patent: Sep. 1, 1998

[54] COMPACT WATER COLLECTOR

[75] Inventors: Nigel G. M. Palmer, West Granby; Douglas Christians, Vernon; Michael Zager, Windsor, all of Conn.; Maura Vigliano, West Springfield, Mass.; Scott L. Lothian, Enfield; George E. Wilmot, Jr., East Granby, both of Conn.

[73] Assignee: United Technologies Corporation, Windsor Locks, Conn.

[21] Appl. No.: 814,137

[22] Filed: Mar. 10, 1997

[51] Int. Cl.[6] ............................................. B01D 45/06
[52] U.S. Cl. .................... 55/396; 55/462; 55/DIG. 14; 96/360
[58] Field of Search .................... 55/394, 462, 396–398, 55/257.5, DIG. 14, DIG. 17; 95/272; 96/360

[56] References Cited

U.S. PATENT DOCUMENTS 4,681,610   7/1987   Warner .................................. 55/394

*Primary Examiner*—Richard L. Chiesa

[57] ABSTRACT

A moisture collector for collecting moisture from moisture containing air exiting from an air conditioning system in substantially a first flow direction is disclosed. The collector including a moisture collector housing defining a volume. An inlet extends into the volume for receiving the moisture containing air from the air conditioning system while substantially moving in the first flow direction. An outlet extends out of the volume for exhausting substantially moisture free air. A device for redirecting the moisture containing air is positioned within the volume and upstream of the outlet. At the device, moisture is removed from the moisture containing air for forming the substantially moisture free air. An air passageway is defined in the volume for directing the substantially moisture free air from the device for redirecting toward the outlet along with the moisture. A volume for collecting the moisture is provided. A device is positioned in the air passageway in the path of the moisture free air for directing the moisture moving with the moisture free air into the volume for collecting downstream of the outlet.

12 Claims, 1 Drawing Sheet

COMPACT WATER COLLECTOR

TECHNICAL FIELD

This invention is directed to water collectors, and more particularly, to a compact water collector for use in an environmental control system of an aircraft or other vehicle.

BACKGROUND ART

In air cycle air conditioning systems, condensing heat exchangers discharge cool air streams which carry droplets of moisture which are generally removed by a water collector. That is, unless the moisture is removed from the air stream, these droplets may reduce system efficiency and erode system components, particularly rotating mechanisms. Accordingly, heat exchangers, turbines and ducting of these air conditioning systems, and components thereof, may be subjected to such things.

Typically, the water to be removed is concentrated on the duct walls upstream from the water collector due to a type of centrifugal separation affected by the meandering course that the ducts follow. Therefore, the portion of the air stream closest to the duct walls carries the highest concentration of water.

Certain prior art water collectors have been successful in removing water from moisture laden air. Such a system is shown in U.S. Pat. No. 4,681,610 to Warner, which discloses a high performance water collector. However, the shape and size of this water collector, and its installation requirements, are not conducive to the current needs of aircraft environmental control systems, which have recently been determined to require improved water collectors, subsequent to their installation in the aircraft. Existing water collectors cannot be retrofit in the environmental control systems or air conditioning systems of these aircraft. One particular reason for the inability to retrofit current water collecting systems is that, in many applications, the preferred location for placing the water collector does not allow sufficient space to install existing water collector designs.

There exists a need, therefore, for a compact water collector which is highly effective in removing water from moisture laden air exiting the heat exchanger of an air cycle air conditioning system, which collector also has a shape and design which allows it to be retrofit with existing, already installed air conditioning systems.

DISCLOSURE OF INVENTION

The primary object of this invention is to provide an improved compact water collector for use with air cycle air conditioning systems of vehicles, and particularly, aircraft.

Another object of this invention is to provide a compact water collector which has a size, shape and design allowing it to be retrofit with currently installed air cycle air conditioning systems of aircraft.

Still another object of this invention is to provide a compact water collector designed for installation in currently existing duct work of an air cycle air conditioning system of an aircraft, particularly duct work with right angle turns into and/or out of the water collector.

The objects and advantages set forth herein are achieved by the moisture collector of the present invention for collecting moisture from moisture containing air exiting from an air conditioning system in substantially a first flow direction. The collector comprises a moisture collector housing defining a volume. An inlet extends into the volume for receiving the moisture containing air from the air conditioning system while substantially moving in the first flow direction. An outlet extends out of the volume for exhausting substantially moisture free air. A device for redirecting the moisture containing air is positioned within the volume and upstream of the outlet. At the device, moisture is removed from the moisture containing air for forming the substantially moisture free air. An air passageway is defined in the volume for directing the substantially moisture free air from the device toward the outlet. A volume for collecting the moisture is provided. A device is positioned in the air passageway in the path of the air flow for directing the moisture moving with the moisture free air into the volume for collecting downstream of the outlet.

BEST MODE FOR CARRYING OUT THE INVENTION

Figure 1:
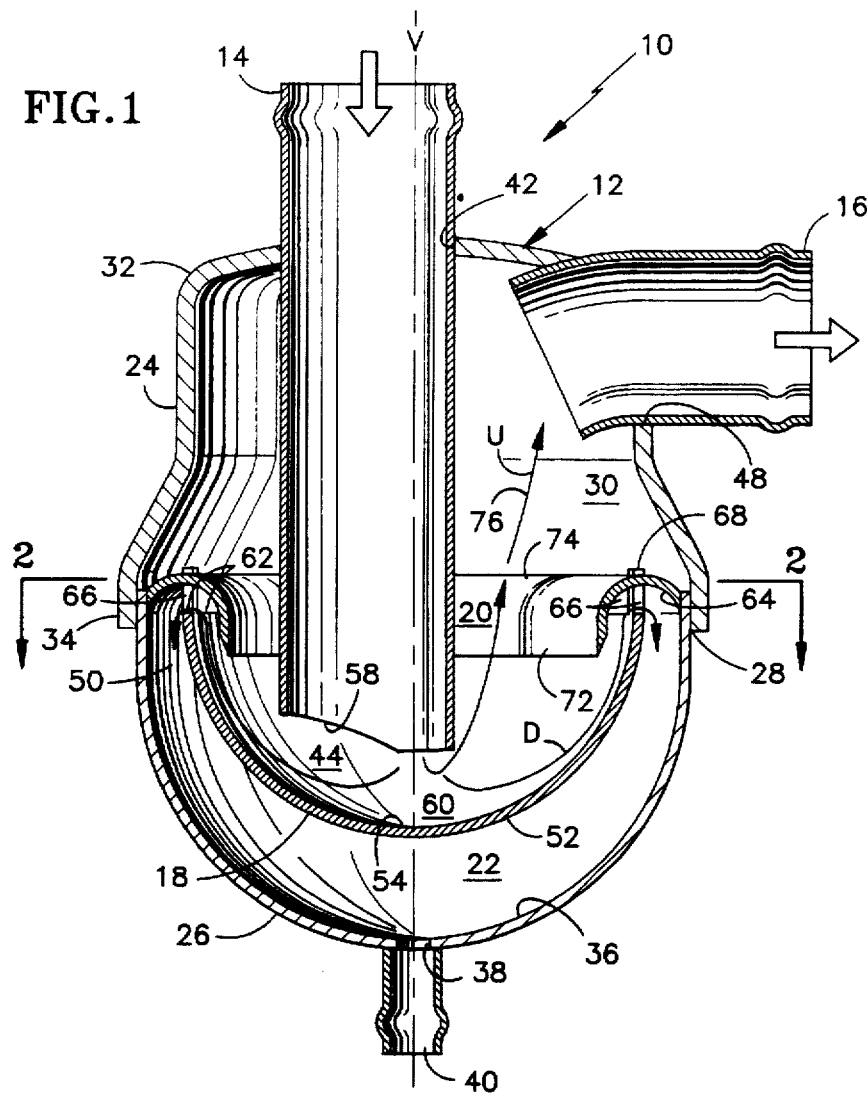
FIG. 1 is a cross-sectional and elevational view of a compact water collector in accordance with the principles of the present invention.

Referring now to the drawings in detail, there is shown in FIG. 1 an elevational and cross-sectional view of the water collector of the present invention, designated generally as 10. Water collector 10 generally includes a housing 12, an inlet 14, an outlet 16, a first deflector 18, a second deflector 20, and a water collection volume 22.

Housing 12 is generally comprised of a first cup-shaped half 24 and a second cup-shaped half 26, wherein halves 24 and 26 are engaged and connected at area 28. Halves 24 and 26 define a volume 30 through which air flow takes place. Half 24 includes a narrow portion 32 and a wider mouth portion 34, although other shapes may certainly be used. Half 26 is preferably hemispherical in shape and includes an inner cupped surface 36 which defines a portion of the water collecting volume 22. In its typical application, half 24 is the upper half of collector 10 and half 26 is the lower half of collector 10, so as to allow the force of gravity to assist flow of water into water collection volume 22. To drain water from collection area 22, half 26 includes a drain opening 38, preferably in the lowermost portion thereof. Drain opening 38 is also preferably connected to a tubular drain pipe 40 for directing the water out of collection volume 22.

Inlet 14 is preferably a tubular component and extends from outside housing 12 through an opening 42 therein and in the direction of the first deflector plate 18, in the volume 44 defined thereby. Inlet 14 is preferably offset from the centerline of water collector 10, as shown, and extends substantially parallel the vertical axis V of the collector.

Outlet 16 is also preferably in the form of a tubular component extending from inside the upper portion of half 24 of housing 12, through opening 48 therein. The outlet extends substantially transverse to the vertical axis V of the collector. Accordingly, moisture-free air exits collector 10 through outlet 16.

Figure 2:
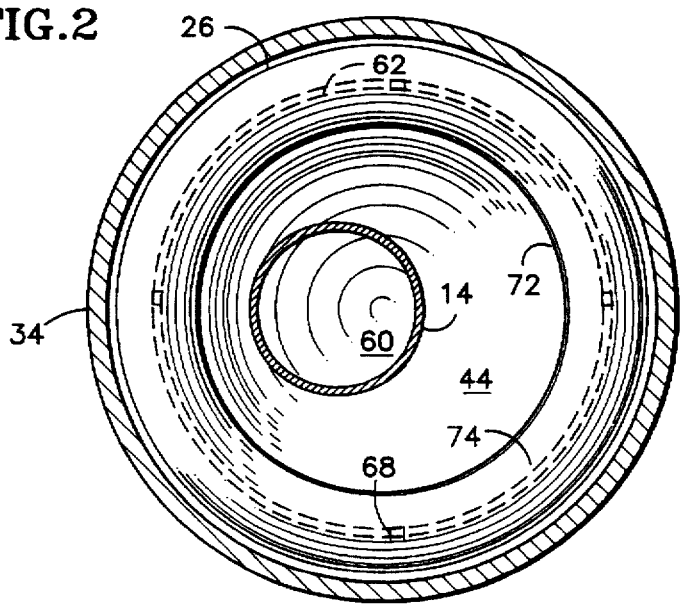
FIG. 2 is a cross-sectional view taken along line 2—2 of FIG. 1.

As indicated above, first deflector 18 is positioned in volume 30, and more particularly, in the portion thereof defined by lower half 26. First deflector plate 18 is preferably cup-shaped and is spaced from and substantially concentric to cupped surface 36 of lower half 26. Accordingly, a space 50 is formed between cupped surface 26 and the outer surface 52 of the first deflector plate 18. Deflector plate 18 includes an upper cupped or curved surface 54 against which moisture laden air entering collector 10 from inlet 14 is directed. Accordingly, air is directed through inlet 14 against cupped surface 54 and into the volume portion 44 defined by the first deflector plate. The end 58 of inlet 14 is spaced upwardly from surface 54 so as to allow the flow of the moisture laden air against surface 54 for redirection out of the area 60 between end 58 and surface 54. First deflector plate 18 includes an upper rim 62, as shown in FIG. 2. Rim 62 extends to a position below cupped surface 64 of second deflector plate 20. Accordingly, a gap 66 is formed between rim 62 and surface 64. Water is forced out of the moisture laden air on impact with first deflection plate 18 and is then directed to water collection volume 22, through gap 66 via diverted air, which is represented by arrows D. Various types fastening means 68 may be used to attach first deflector plate 18 to second deflector plate 20, the particular embodiment of which is inconsequential to the present invention.

Second deflector plate 20 is substantially ring-shaped and has a substantially U-shaped cross section defining cupped surface 64, as shown in FIG. 1. Accordingly, second deflector plate 20 extends over and around rim 62, substantially concentric to half 24 and adjacent the inner wall thereof. The inner portion 72 of the U-shaped wall forming deflector plate 20 extends downwardly toward deflector plate 18, as shown, and into volume portion 44. The outer portion 74 of the deflector plate 20 extends into engagement with housing 12, preferably concentric to the inner wall of lower half 26. The portion 72 of the second deflector plate and its portion of cupped surface 64 functions to maintain any water droplets initially separated from the moisture laden air within gap 66 for subsequent direction into collection volume 22, away from the moisture free air. Accordingly, an air passageway 76 is created from area 60 at the exit of inlet 14 upwardly through the center of deflection plate 20 into outlet 16, as indicated by arrows U.

As can be seen from FIG. 1, collector 10 is designed via the substantially right angle relative positioning of inlet 14 and outlet 16 for placement in existing ducting of an aircraft or other vehicle, specifically at a right angle turn in direction. With minimal changes, however, in the housing structure, collector 10 may be arranged to fit in straight duct work or duct work arranged at different angles. Accordingly, with the structure as described, collector 10 may be retrofit into the air conditioning systems of various currently existing aircraft, without having to remove the actual air conditioning system therefrom.

In operation, water collector 10 receives high pressure, moisture laden air, typically in the form of bleed air from a heat exchanger, although other sources may be used. The moisture laden air is forced to flow in inlet 14. The moisture laden air exits end 58 of inlet 14 and collides with the cupped surface 54 of first deflector plate 18. Due to the cupped, upwardly curved nature of surface 54, airflow is redirected and continues over the surface and upwardly toward outlet 16. Accordingly, an air passageway 76 is created between volume 60, at the end 58 of inlet 14, and outlet 16. As the air flows through air passageway 76, the water droplets adjacent to the surface are dragged on surface 54 along with the diverted air, as represented by arrows D. Enroute through passageway 76, the air passes through the opening in the center of second deflector plate 20. The water droplets remain substantially against surface 54 and as the water droplets move towards the center opening of second deflector plate 20, they are forced under portion 72 of the wall defining second deflector plate 20 and into gap 66 over rim 62 via diverted air D, while most of the air continues upward toward outlet 16, as indicated by arrows U. The cup-shaped surface 64 of second deflector plate 20 and the diverted air flow force the water droplets into collection volume 22 where the excess moisture is accumulated. The water is drained from volume 22 via drain 40 so as to provide a continual capacity for receiving the removed moisture.

In accordance with the above, an efficient and highly functional compact water collector is provided which can be installed in the duct work of air conditioning systems of existing aircraft, particularly at right angle turns, without having to remove the entire system or substantial portions thereof.

The primary advantage of this invention is that an improved compact water collector is provided for use with air cycle air conditioning systems of vehicles, and particularly, aircraft. Another advantage of this invention is that a compact water collector is provided, which has a size, shape and design allowing it to be retrofit with currently installed air cycle air conditioning systems of aircraft. Still another advantage of this invention is that a compact water collector is provided which is designed for installation in currently existing duct work of an air cycle air conditioning system of an aircraft, and particularly, at a right angle turn in the duct work.

Although the invention has been shown and described with respect to a best mode embodiment thereof, it should be understood by those skilled in the art that the foregoing and various other changes, omissions, and additions in the form and detail thereof may be made without departing from the spirit and scope of the invention.

We claim:

1. A moisture collector for collecting moisture from moisture containing air exiting from an air conditioning system in substantially a first flow direction, comprising:

a moisture collector housing defining a volume and having a centerline;

an inlet extending into said volume for receiving said moisture containing air from said air conditioning system while substantially moving in said first flow direction wherein said inlet is offset from said centerline;

an outlet extending out of said volume for exhausting substantially moisture free air;

means for redirecting said moisture containing air within said volume and upstream of said outlet, said means for redirecting comprising a first cupped plate, being hemispherical in shape, and including a first cupped surface, wherein said first cupped surface is positioned substantially transverse said first flow direction to receive said moisture containing air there against for directing moisture from said moisture containing air for forming said substantially moisture free air;

an air passageway defined in said volume for directing said substantially moisture free air from said means for redirecting toward said outlet along with said moisture wherein said first cupped surface defines a portion of said air passageway;

means for collecting said moisture comprising a second cupped plate being hemispherical in shape and including a second cupped surface, wherein said second cupped plate is positioned substantially concentric said first cupped plate; and means positioned in said air passageway in the path of said substantially moisture free air for directing said moisture moving with said substantially moisture free air into said means for collecting downstream of said outlet, said means for directing comprising a deflecting component positioned in said air passageway and partially obstructing said air passageway to deflect any moisture traveling with said substantially moisture free air into said means for collecting.

2. The collector according to claim 1, further including a gap connecting said air passageway to said means for collecting, wherein said gap is positioned upstream of said deflecting component.

3. The collector according to claim 2, wherein said gap is positioned between said deflecting component and said first cupped surface.

4. The collector according to claim 3, wherein a portion of said air passageway is directed through said gap.

5. The collector according to claim 1, wherein said first cupped plate includes a leading edge, and wherein said deflecting component is substantially ring shaped and extends adjacent said leading edge and defines a central opening, further including a gap between said deflecting component and said leading edge, said air passageway defined through said central opening and said gap.

6. The collector according to claim 5, wherein said deflecting component includes another cupped surface which is opposed to said first cupped surface, said another cupped surface defining a circumferential volume, wherein said leading edge extends into said circumferential volume.

7. The collector according to claim 6, wherein said gap is defined between said another cupped surface, said first cupped surface and said leading edge.

8. The collector according to claim 1, wherein said first cupped surface defines a hemispherical volume, and wherein said inlet comprises a tubular component extending from outside said housing and into said hemispherical volume.

9. The collector according to claim 8, wherein said outlet comprises a tubular component extending from said air passageway to a location outside of said housing.

10. The collector according to claim 1, wherein said inlet is positioned at a substantially right angle to said outlet.

11. The collector according to claim 1, wherein said collector has a vertical axis, and wherein said inlet extends substantially parallel said vertical axis and said outlet extends substantially transverse to said vertical axis.

12. The collector according to claim 1, said first cupped plate comprising a curved surface wherein said curved surface defines a portion of said means for collecting.

* * * * *